United States Patent [19]
Kerth

[11] Patent Number: 5,442,850
[45] Date of Patent: Aug. 22, 1995

[54] MAGNETIC HEAD SLIDER PROCESS

[75] Inventor: Randall T. Kerth, San Jose, Calif.

[73] Assignee: International Business Machines Corporation, Armonk, N.Y.

[21] Appl. No.: 146,552

[22] Filed: Nov. 1, 1993

[51] Int. Cl.⁶ .............................. G11B 5/42
[52] U.S. Cl. ..................... 29/603; 360/103; 360/104
[58] Field of Search ............ 29/603; 72/53, 76; 360/102–104

[56] References Cited

U.S. PATENT DOCUMENTS

| | | | |
|---|---|---|---|
| 3,685,216 | 8/1972 | Frey et al. | 51/325 |
| 4,333,229 | 6/1982 | Ellenberger | 29/603 |
| 4,420,780 | 12/1983 | Deckert | 360/103 |
| 4,870,521 | 9/1989 | Okabayashi | 360/103 |
| 4,910,621 | 3/1990 | Matsuda et al. | 360/104 |
| 4,939,603 | 7/1990 | Inumochi | 360/103 |
| 5,065,500 | 11/1991 | Yoneda et al. | 29/603 |
| 5,083,365 | 1/1992 | Matsumoto | 29/603 |
| 5,095,613 | 3/1992 | Hunnsinger et al. | 29/603 |
| 5,136,445 | 8/1992 | Zak | 360/103 |

FOREIGN PATENT DOCUMENTS 63-95343 10/1989 Japan ................ G11B 5/60

OTHER PUBLICATIONS

International Technology Disclosures v2 n3 Mar. 1984, W. Jacobs "Method For Pre-Stressing Row Tp Achieve Positive Crown Air Bearing Slider".
Research Disclosure n253 May 1985, A. F. Diaz & C. R. Jih "Fabrication Process for Crown Sliders".
IBM Confidential Document Disclosure, Docket No. SA990069, Jun. 1992, "A Process For The Control Of Crown And Camber" A. P. Deshpande et al.

Primary Examiner—Carl E. Hall
Attorney, Agent, or Firm—James C. Wilson; Duke W. Yee; Andrew J. Dillon

[57] ABSTRACT

A process for fabricating a slider for mounting a magnetic transducer within a magnetic disk storage system. The process includes identifying one side of the slider, selecting at least one section on the selected side of the slider, and impinging the identified section with a stream of particles, wherein the curvature of the slider may be selectively altered.

26 Claims, 7 Drawing Sheets

MAGNETIC HEAD SLIDER PROCESS

BACKGROUND OF THE INVENTION

1. Technical Field

The present invention relates in general to magnetic disk storage systems, and in particular to a process for creating a slider for mounting a magnetic transducer within a magnetic disk storage system. Still more particularly, the present invention relates to a method for controlling the crown and camber of a thin film slider.

2. Description of the Related Art

Magnetic storage systems are employed for storing large amounts of information and are typically utilized for long term storage in a data processing system, such as work station or a personal computer. In particular, magnetic disk drive systems are employed to read and write information to and from magnetic disks. A magnetic head assembly and a slider are employed in a magnetic disk systems, such as a hard disk drive, and move relative to the surface of a magnetic disk in the hard disk drive.

It is well known that during operation, a magnetic head assembly incorporated in, for example, a hard disk drive, floats a very small distance above the magnetic recording medium (i.e., the hard disk), which is rotated at high speeds. These magnetic head assemblies include a electromagnetic head, such as a magnetic transducer, mounted on a movable arm to read or write information. The magnetic disk system moves the magnetic head to a desired radial position over the surface of the rotating hard disk, where the magnetic head reads or writes information. Typically, the magnetic head is integrally mounted in a carrier called a "slider". A slider provides mechanical support for the magnetic head and the electrical connections between the magnetic head and the rest of the magnetic disk system.

It is desirable to have the slider float as close to the magnetic recording medium as possible and maintain a constant height. It is well known that the degree of stability of flotation of the slider greatly influences the performance of the magnetic transducer in the slider. Different flotation characteristics may be provided by forming the sliding surface of the slider with a lapping process. More information on fabricating thin film head sliders from a wafer may be found in U.S. Pat. No. 5,095,613.

In some instances, it is desirable for the air bearing surface ("ABS") of the slider to have a positive crown, such as is illustrated in U.S. Pat. Nos. 5,136,445, 4,939,603, and 4,420,780 and to improve stability, reduce head-to-disk stiction, and reduce sensitivity to changes in the disk surface topology. In the fabrication process for manufacturing thin film sliders for magnetic recording, a positive crown may be produced by lapping, as disclosed in U.S. Pat. Nos. 3,685,216 and 4,333,229. In other instances, the camber of the slider is important. With a lapping process, however, it is not possible to accurately define the curvature (crown and camber) of a thin film slider. The curvature occurs about a mean that is largely defined by the lapping process, but is not as variable as desired in many instances.

U.S. Pat. No. 4,910,621 illustrates a method that may be used to produce a curve in a thin film slider by creating a groove in one end of the slider, placing a sealing agent in the groove, and thereafter melting and stiffening a sealing agent in the groove. The sealing agent is selected such that the sealing agent shrinks when stiffened, causing a curve in the slider. This method, however, requires a number of steps to produce a final product and requires a sealing agent to be added to the thin film slider. This process requires additional processing steps, time, and materials.

Therefore, it would be desirable to have an efficient process for fabricating a slider and accurately controlling the curvature of the air bearing surface of the slider.

SUMMARY OF THE INVENTION

It is therefore one object of the present invention to provide an improved magnetic storage system.

It is another object of the present invention to provide an improved process for manufacturing a slider for mounting a magnetic transducer within a magnetic disk storage system.

It is yet another object of the present invention to provide an improved method for controlling the crown and camber of a slider.

The foregoing objects are achieved as is now described. The present invention provides a process for fabricating a slider for mounting a magnetic transducer within a magnetic disk storage system. The process includes identifying one side of the slider, selecting at least one section on the selected side of the slider, and impinging the identified section with a stream of particles, wherein the curvature of the slider may be selectively altered.

The curvature of the slider to be altered may be the crown or camber of the slider, as measured by profile data from the rails. The slider typically has two or more rails on one side. Application of the stream of particles on the side of the slider containing the rails produces an increase in the magnitude of the curvature, while application of the stream on the other side of the slider produces a decrease in the magnitude of the curvature. The curvature of the slider may therefore be altered to some desired amount. Both positive and negative curvatures may be produced by the disclosed process.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
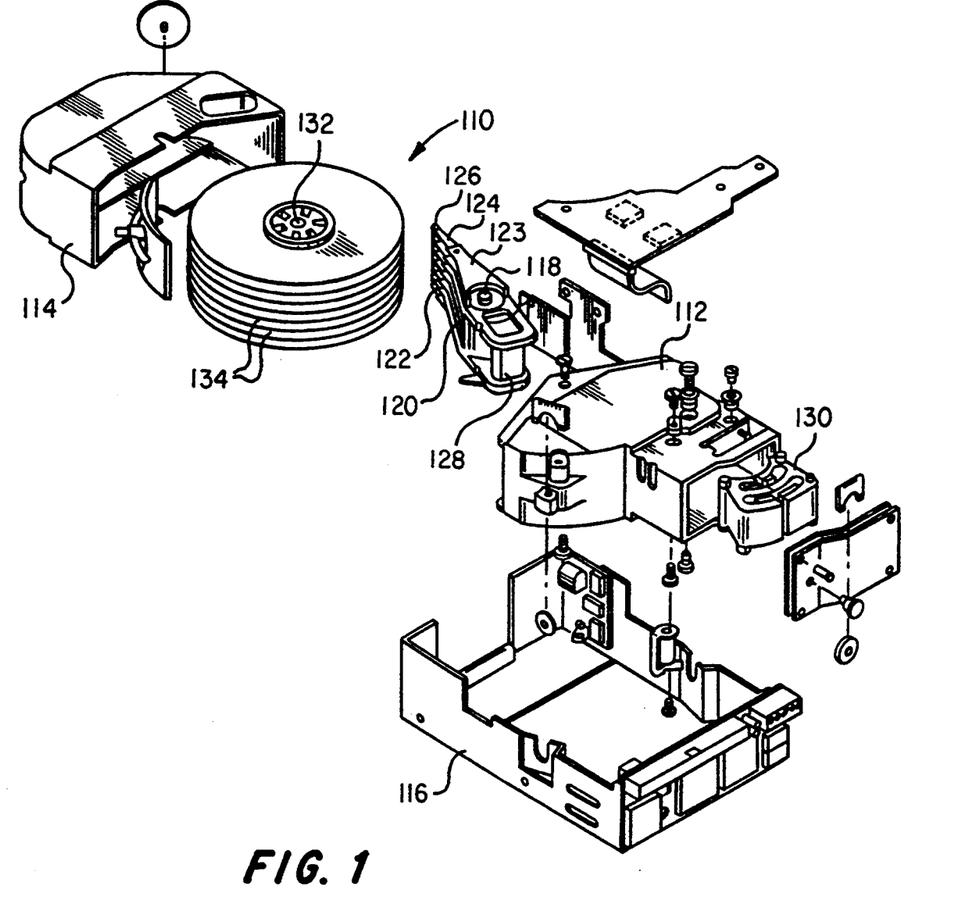
FIG. 1 is a pictorial representation of an exploded view of a disk drive system which incorporates a slider produced in accordance with a preferred embodiment of the present invention.

The invention described in this application may be utilized with all known mechanical configurations of disk drives or direct access storage devices ("DASD"). With reference now to the figures, and in particular with reference to FIG. 1, there is depicted a pictorial view of an exploded view of disk drive 110. It should be noted that although a rotary actuator is shown the invention described herein is also applicable to linear actuators. Disk drive 110 includes housing 112, and housing cover 114 which, after assembly, is mounted within frame 116. Rotatably attached within housing 112 on actuator shaft 118 is actuator arm assembly 120. One end of actuator arm assembly 120 includes an E block or comb-like structure 122 having arms 123. Attached to arms 123 on the comb-like or E block structure 122, are suspension units or load springs 124. Attached at the end of each load spring is a slider 126, which carries a electromagnetic device for reading and/or writing data. On the other end of actuator arm assembly 120, opposite load springs 124 and sliders 126, is a voice coil 128.

Attached within housing 112 is a pair of magnets 130. Magnets 130 and voice coil 128 are key parts of a voice coil motor which apply a force to actuator assembly 120 to rotate it about actuator shaft 118. Also mounted within housing 112 is spindle shaft 132. Rotatably attached to spindle shaft 132 are a number of disks 134. In FIG. 2, eight disks are attached to spindle shaft 132. As shown in FIG. 2, disks 134 are attached to spindle shaft 132 in spaced apart relation. An internal motor (not shown) is utilized to rotate disks 134.

Figure 2A:
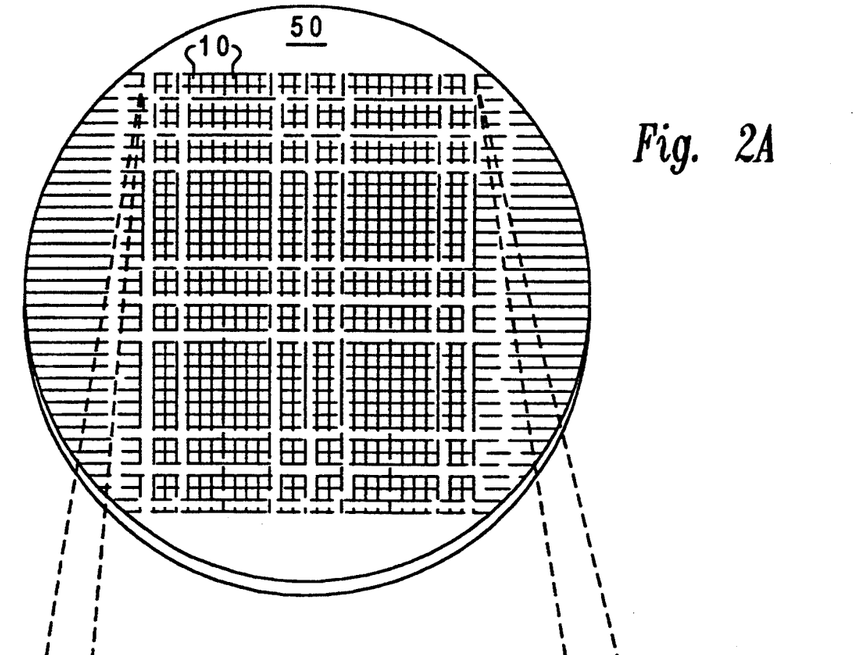
FIGS. 2A–2C depict a perspective view of a processed wafer and a detailed structure thereof produced in accordance with a preferred embodiment of the present invention.

Referring now to FIG. 2A, a wafer 50 is depicted which may be constructed of any suitable and well known slider material such as ferrite, $Al_2O_3$-TiC, or the like. Wafer 50 may be of any convenient size, such as four inches or six inches in diameter. Electromagnetic devices (not shown) are formed in wafer 50. Specifically, wafer 50 is a matrix of sliders 10, which when fully processed will become sliders, such as slider 10 which is illustrated in FIG. 2C.

Figure 2B:
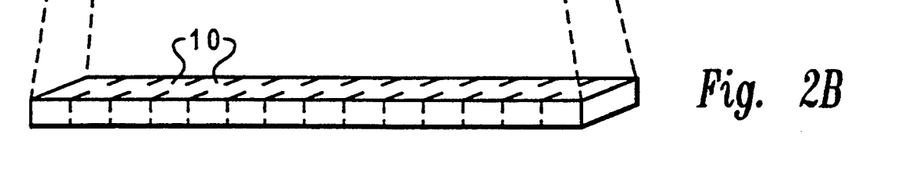

Referring now to FIG. 2B, an end view of a row of sliders 10 are shown. Wafer 50 may be fabricated to contain any desirable number of rows of sliders 10 in each row. Wafer 26 depicted in FIG. 2A contains 14 sliders 10 in each row. In accordance with a preferred embodiment of the present invention, wafer 50 may be broken up into rows as shown in FIG. 2B for processing in accordance with a preferred embodiment of the present invention. Next, FIG. 2C depicts a slider 10 from the row of sliders 10 in FIG. 2B.

Figure 2C:
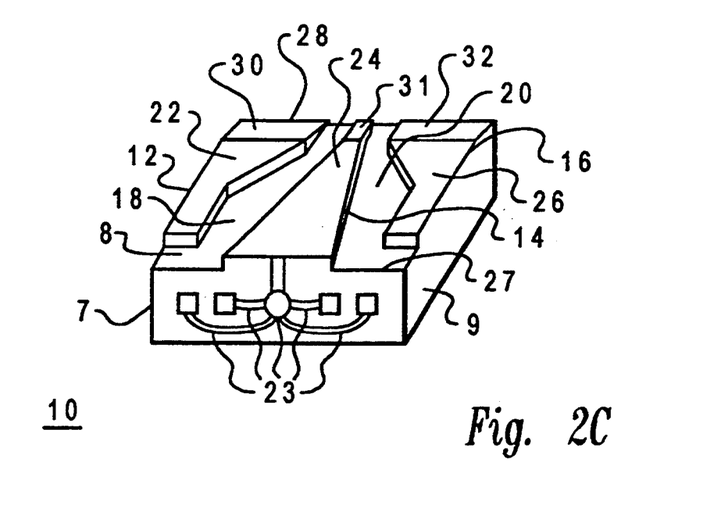

With reference to FIG. 2C, a perspective view of a slider manufactured according to a preferred embodiment of the present invention is depicted. Top surface 8 of slider 10 has three rails 12, 14, and 16. Rail 12 is adjacent to side 7, and rail 16 is adjacent to side 9. Recessed sections 18 and 20 are found between the rails. Rails 12, 14, and 16 are typically 6 μm to 20 μm above recessed sections 18 and 20. Rails 12, 14, and 16 have air bearing surfaces (ABSs) 22, 24, and 26. Leading edge 28 of slider 10 includes tapered sections 30, 31 and 32. Slider 10 includes electromagnetic devices 23, which are used to detect data on a magnetic media, as depicted on the side of back edge 27 of slider 10.

As can be seen, rails 12, 14, and 16 have been formed on slider 10, but the desired "crown" and/or camber have not been set in slider 10. The crown of slider 10 is a measurement of a rail, 12, 14, or 16. The crown is defined as the peak-to-valley difference of a cylindrical arch. The cylindrical arch is taken from the back edge 27 on rail 14 to the beginning of taper 31 of rail 14. To measure a crown, profile data of the rail is taken and any tilt of the rail is subtracted from the profile data. The profile data is then fitted to an x-squared curve. The x-squared curve is then utilized to calculate the peak-to-valley difference across the crown of the rail. The "camber" of slider 10 is the curvature measured from side 7 to side 9. The camber is measured from the profile data of the rails 12, 14, and 16. The camber is also fitted to a x-squared curve from the profile data of the three rails measured from side 7 to side 9. These measurements may be made by one of ordinary skill in the art using a ZYGO interofermetric tool available from ZYGO Corporation, located in Middlefield, Conn.

Figure 3A:
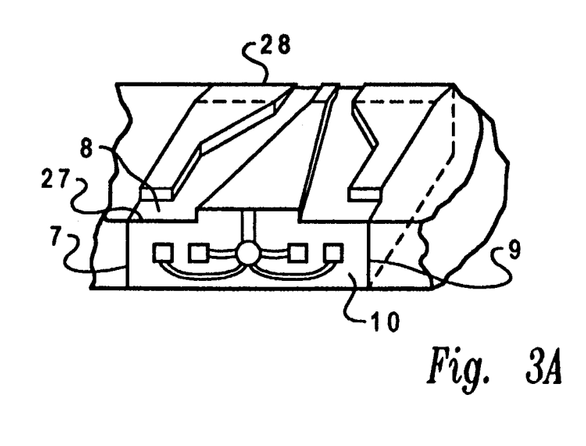
FIGS. 3A–3D are illustrations of a method for adjusting the crown of a slider in accordance with a preferred embodiment of the present invention.
Figure 3B:
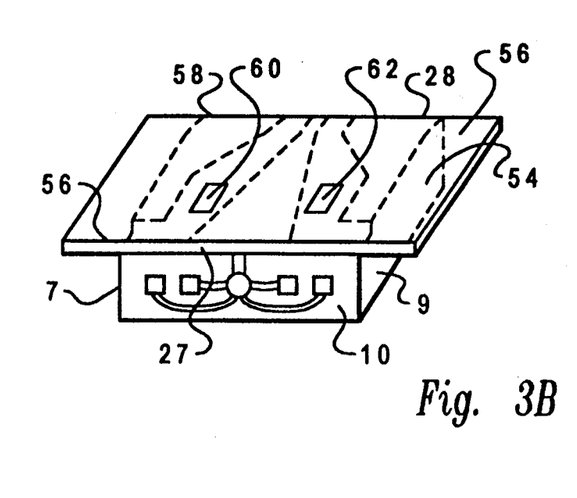
Figure 3C:
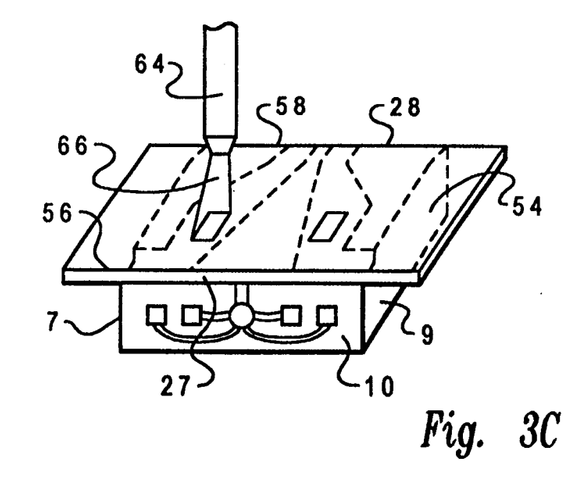

Referring now to FIG. 3A, a top view of slider 10 from FIG. 2C is illustrated. A mask 54 is placed over slider 10 in FIG. 3B. Mask 54 has a leading edge 56 and a trailing edge 58. Mask 54 includes apertures 60 and 62. A stream of particles travelling at a selected velocity are directed at apertures 60 and 62 to induce compressive stress in the exposed regions of slider 10. Nozzle 64 propels a stream of particles 66 into aperture 60 of mask 54. These particles "sandblast" or "shot peen" the exposed surfaces of slider 10. Particles in the stream may penetrate and damage the grain boundaries of the material forming the wafer. The surface may open up and attempt to spread out. Raised surfaces of about 20 nm may occur as a result of "sandblasting" or "shot peening" the exposed surfaces. The particles preferably have jagged or rough surfaces. Materials such as aluminum oxide or silicon carbide may be employed in accordance with a preferred embodiment of the present invention. In selecting particles, the particles should be hard enough such that the surface of the wafer can be damaged by the particles. Additionally, it is desirable to employ particles that are stable, economical, and non-toxic.

Figure 3D:
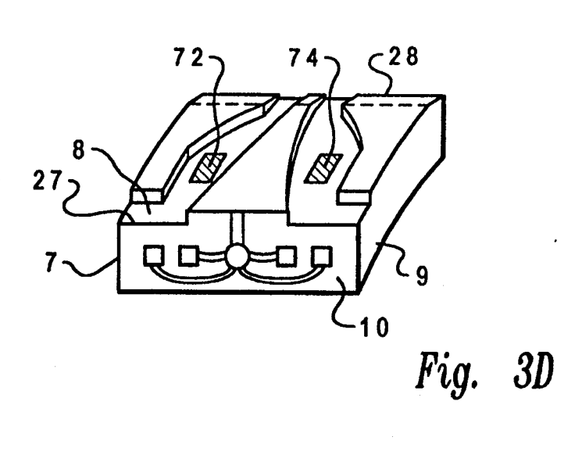

The size of the particles should be small enough to enter the apertures created in the mask. For most sliders manufactured for hard disk drive units, a particle size from about 20 μm to about 75 μm in diameter may be employed in accordance with a preferred embodiment of the present invention. 50 micron aluminum oxide and 50 micron silicon carbide are examples of abrasive particles, which may be employed in accordance with a preferred embodiment of the present invention. These abrasive particles may be obtained from Crystal Mark, Inc., located in Glendale, Calif. In FIG. 3D, slider 10 is depicted with sand blasted regions 72 and 74 and a resultant crown.

Figure 4A:
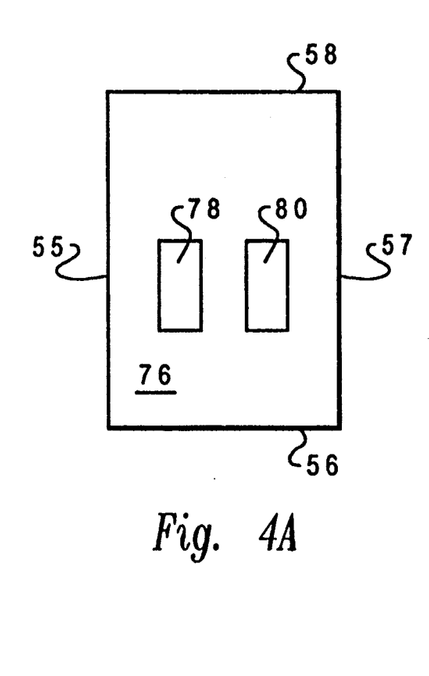
FIGS. 4A–4C illustrate masks that may be utilized to alter the curvature of a slider unit in accordance with a preferred embodiment of the present invention.
Figure 4B:
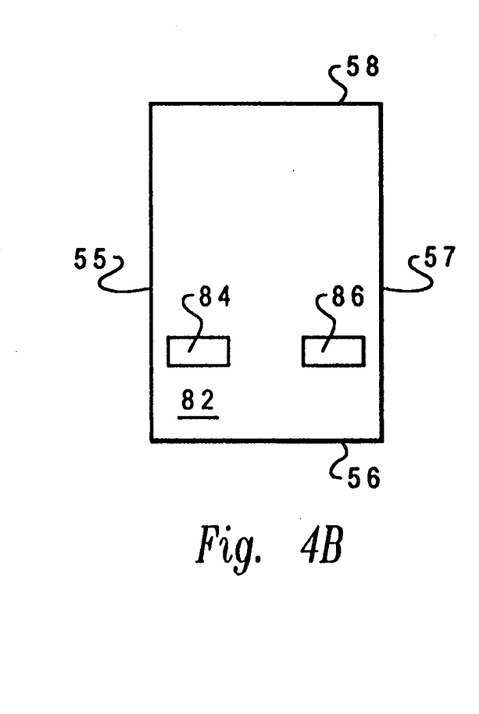
Figure 4C:
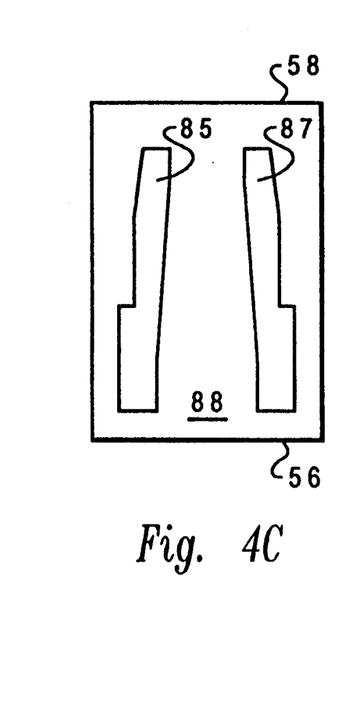

Various aperture dimensions (shapes and sizes) may be employed to obtain different changes in curvatures in a slider unit in accordance with a preferred embodiment of the present invention. FIGS. 4A–4C illustrate examples of masks with different aperture dimensions that may be utilized to alter the curvature of a slider. Referring first to FIG. 4A, mask 76 contains two rectangular apertures 78 and 80 that are aligned with recessed regions in slider 10. Front edge 56 is aligned with leading edge 28 of the slider 10. This mask shape and orientation results in a crown change that is greater than the camber change. If a change in camber is desired, a mask such as mask 82 illustrated in FIG. 4B should be employed. Mask 82 is similar to mask 76 except that apertures 84 and 86 are formed such that they are wider than they are long. The apertures may be of any geometry, as shown by apertures 85 and 87 in mask 88 in FIG. 4C.

By exposing regions on slider 10 in a shape that is longer from back edge 27 to leading edge 28 than from side 7 to side 9, changes in crown may be made. When the exposed regions are wider from side 7 to side 9 than they are long, from back edge 27 to leading edge 28, the camber of a slider may be adjusted. The exposed regions on a slider impinged by the particles should be within the recessed regions found between rails in accordance with a preferred embodiment of the present invention. Thus, in accordance with a preferred embodiment of the present invention, the apertures in the mask may expose any region on the slider, excluding the rails. Preferably, a distance from 40 $\mu$m to 50 $\mu$m from the edge of the rails should not be exposed by the mask when the rails are excluded, in accordance with a preferred embodiment of the present invention.

Although the depicted masks illustrate three different types of apertures, a number of different dimensions and locations for apertures in a mask may be selected by those of ordinary skill in the art, based on the particular slider being processed and based on the type of curvature change desired, such as camber or crown.

The mask may be fabricated from a number of different materials. In accordance with a preferred embodiment of the present invention, the mask is fabricated from $Al_2O_3$-TiC and apertures in the mask may be created using a YAG laser. Other materials, such as metal or metal alloys also may be employed.

In accordance with a preferred embodiment of the present invention, the tapered sections of a slider are typically not "sandblasted" or "shot peened" by particles because damaging the surface of the slider in these sections will not effect the curvature of the slider to any appreciable amount. By applying the mask to the surface of the slider containing the rails, a positive change in camber or crown may be introduced. Reduction of camber or crown in a slider may be achieved by exposing regions on the back side of the slider and applying a stream of particles to the bottom surface of the slider. In fact, a negative crown or camber may be made by impinging the bottom surface of the slider with a stream of particles. Thus, increases and decreases in slider curvatures may be accomplished by impinging the top or bottom surface of the slider. Although the depicted slider is a three rail slider, other configurations and types of sliders, such as a two rail slider, may be manufactured using the process according to the present invention.

Figure 5:
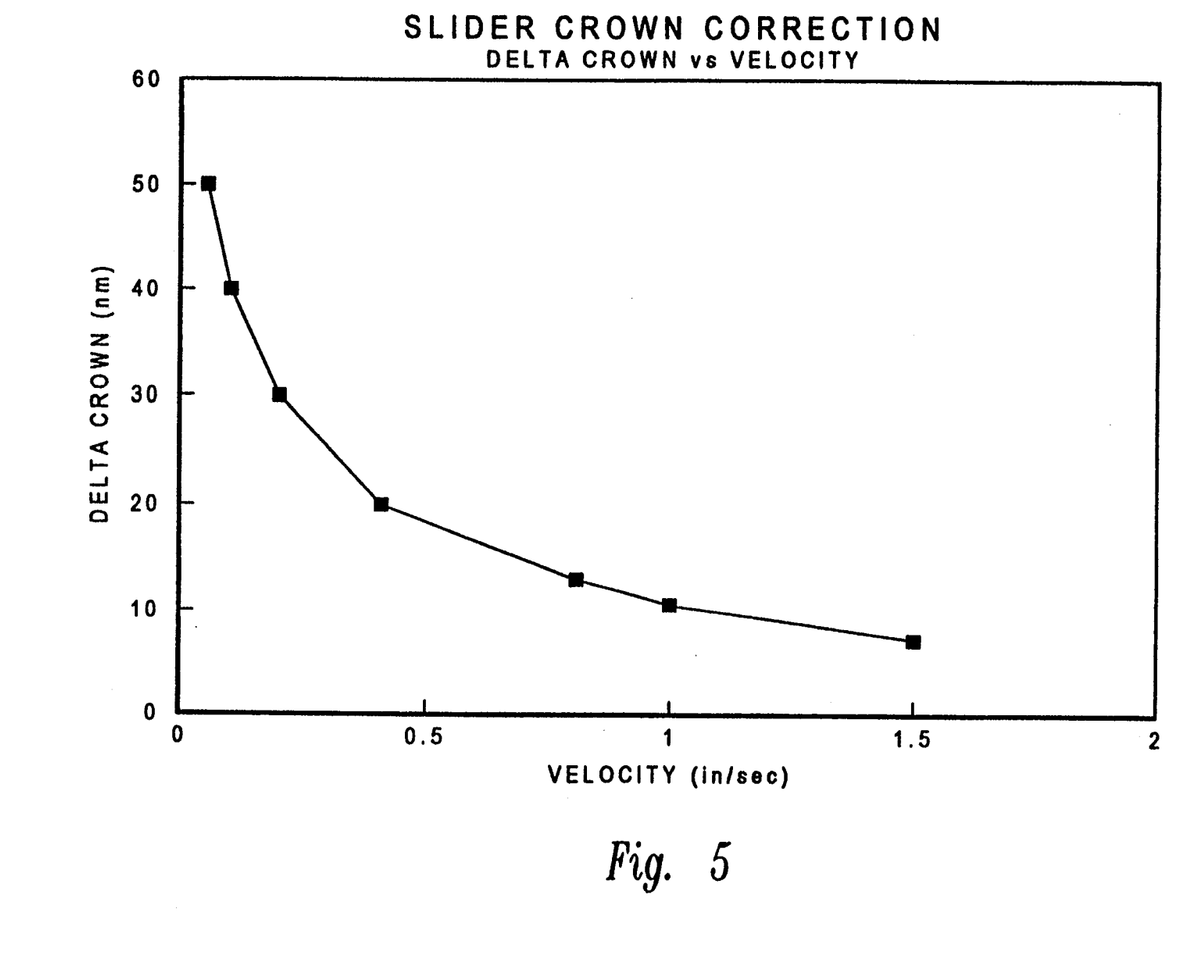
FIG. 5 is a graph of slider crown correction depicting a change in crown versus velocity in accordance with a preferred embodiment of the present invention.

Referring now to FIG. 5, a graph of slider crown correction showing the change in crown versus the velocity is depicted. The delta crown (nm) is illustrated in relation to the velocity (in/sec) of a nozzle moving over and past the apertures of a mask. These results were obtained using an abrasive powder, 50 micron aluminum oxide available from Crystal Mark, Inc., located in Glendale, Calif. A microprocessor controlled nozzle positioner, a SWAM-NOZ POZ, available from Crystal Mark, Inc. was used along with a rectangular abrasive nozzle, part number 353-125X, having a nozzle size of 0.006 inches by 0.100 inches available from Crystal Mark, Inc. was employed. The nozzle was positioned a distance of 2.5 mm from the nozzle tip to mask and the aluminum oxide was forced through the nozzle under a pressure of 60 pounds per square inch (psi). The changes in crown for different nozzle velocities are shown in FIG. 5. The stream of particles was directed at the top surface of the slider providing a positive change or increase in the crown of the slider.

Figure 6:
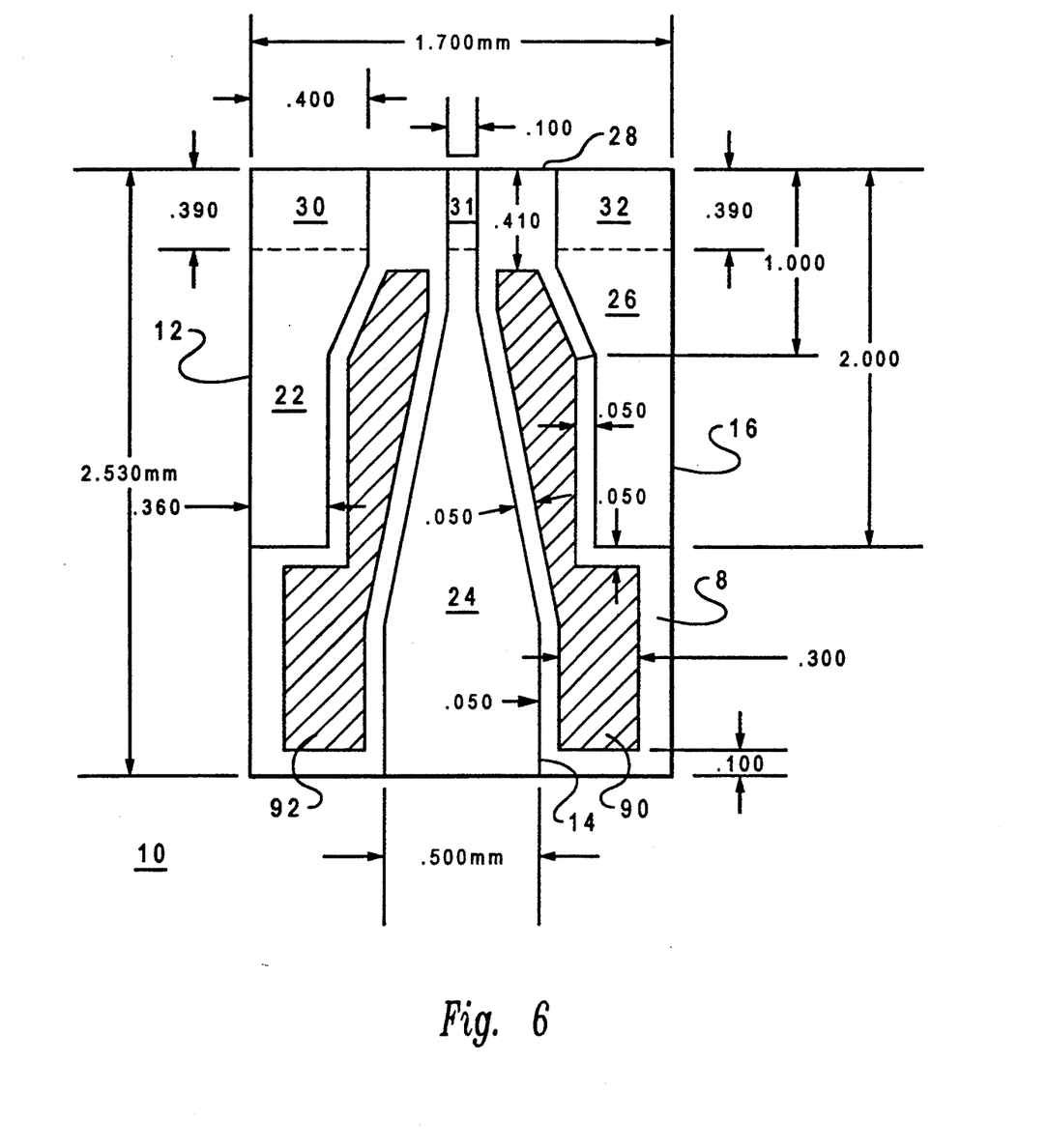
FIG. 6 is a top view of a slider processed to obtain the results depicted in the graph in FIG. 5 in accordance with a preferred embodiment of the present invention.
Figure 7:
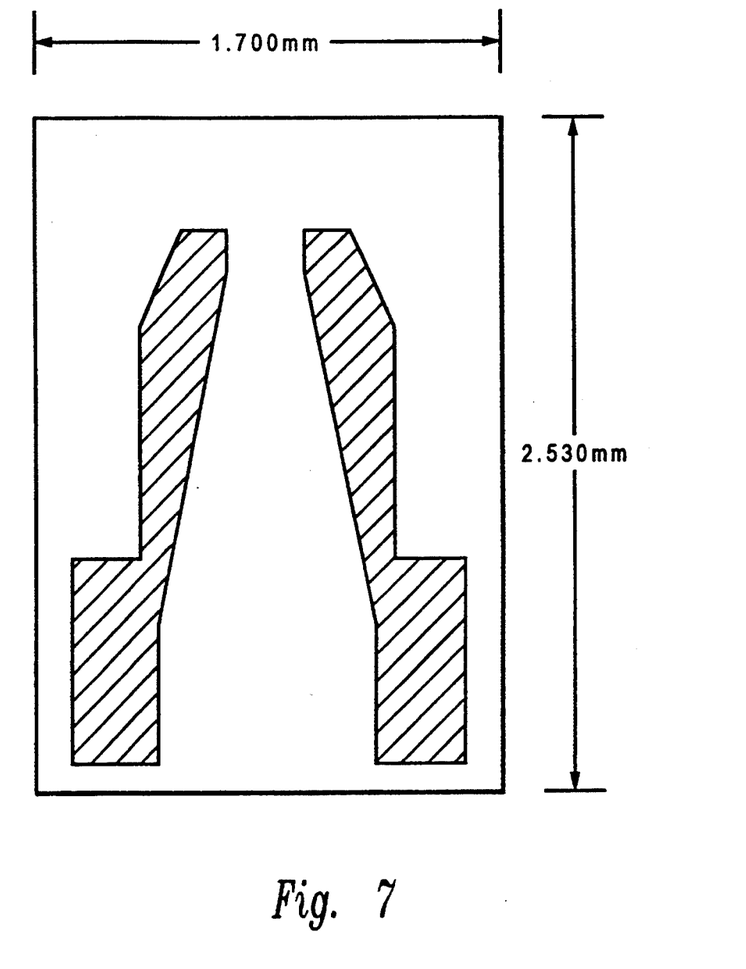
FIG. 7 illustrates a mask placed over the slider depicted in FIG. 6 in accordance with a preferred embodiment of the present invention.

FIG. 6 is a top view of a slider 10 processed as described above with reference to FIG. 6. The rails are 20 $\mu$m above the recessed sections. Sections 90 and 92 are areas that were exposed to the stream of 50 micron aluminum oxide particles forced through the nozzle under a pressure of 60 psi. As can be seen, a margin of at least 0.050 mm or 50 $\mu$m was maintained between the exposed areas and the rails. FIG. 7 illustrates a mask that was placed over the slider illustrated in FIG. 6. In practice, a mask including multiple sets of apertures, such as that depicted in FIG. 7, would be created for placement over an entire row of sliders and the nozzle would be programmed to pass over the row of sliders at a preselected velocity in accordance with a preferred embodiment of the present invention. In a situation in which the crowns for each slider in a row of sliders is already known, the microprocessor controlled nozzle positioner can be programmed to change the velocity of the nozzle as it passes from one set of apertures for one slider to the next set of apertures so that the sliders can all be selectively corrected to the same crown even though the original crowns may be different.

In accordance with a preferred embodiment of the present invention slider units would be processed in rows selected from a wafer, as shown in FIG. 2B. The nozzle would scan over a row at a selected velocity to produce the desired change in crown. Although, the depicted example employs a nozzle scanning over a row of sliders, other methods of propelling particles may be utilized in accordance with a preferred embodiment of the present invention. For example, a nozzle may be positioned over an individual slider and a stream of particles may be forced through the nozzle for a selected amount of time on to the regions exposed by the apertures in the mask. The crown or camber of the slider also may be altered up to the point that the slider is suspended on the spring or suspension unit that is mounted on the actuator arm.

While the invention has been particularly shown and described with reference to a preferred embodiment, it will be understood by those skilled in the art that various changes in form and detail may be made therein without departing from the spirit and scope of the invention.

What is claimed is:

1. A method for fabricating a slider having a curvature and two sides, said method comprising:

selecting one side of said slider;

selecting at least one section on said selected side of said slider; and inducing a preselected amount of compressive stress within said selected at least one section to effect a change in curvature, wherein said curvature of said slider may be altered by varying said preselected amount of compressive stress and a location of said at least one section, wherein said step of inducing a preselected amount of compressive stress within said selected at least one section comprises impinging said at least one section with a plurality of particles for a preselected amount of time.

2. The method of claim 1, wherein said step of inducing a preselected amount of compressive stress within said selected at least one section comprises impinging said at least one section with a plurality of particles for a preselected amount of time, wherein said plurality of particles are from about 20 nm to about 75 nm in diameter.

3. The method of claim 2, wherein said step of impinging said at least one section with a plurality of particles for a preselected amount of time includes impinging said at least one region with a stream of aluminum oxide particles for a preselected amount of time.

4. The method of claim 3, wherein said step of impinging said at least one region with aluminum oxide includes impinging said at least one region with a stream of 50 micron aluminum oxide particles for a preselected amount of time.

5. A method of fabricating a slider, said slider having a curvature and first and second sides, said first side having a number of rails, said method comprising:
selecting one side of said slider;
selecting at lest one region on said selected side; and
impinging said selected at least one region with a plurality of particles, wherein said curvature of said slider is varied.

6. The method of claim 5, wherein said step of selecting one side of said slider includes selecting said first side and wherein said step of selecting at least one region on said selected side includes selecting said at least one region such that said at least one region excludes said number of rails.

7. The method of claim 6, wherein said step of selecting said at least one region such that said at least one region excludes said number of rails includes selecting said at least one region such that a distance from about 40 nanometers to about 50 nanometers separates said at least one region from each of said number of rails.

8. The method of claim 5, wherein said step of impinging said selected at least one region with a plurality of particles comprises impinging said selected at least one region with a plurality of particles for a preselected period of time.

9. The method of claim 5, wherein said step of impinging each of said selected at least one region with a plurality of particles for a preselected period of time includes impinging said selected at least one region with a plurality of particles travelling at a preselected velocity.

10. The method of claim 5, wherein said step of selecting at least one region on said first side comprises placing a mask over said slider, wherein said mask includes at least one aperture exposing said at least one region and impinging said selected at least one region exposed by said at least one aperture with a plurality of particles moving at a preselected velocity.

11. The method of claim 10, wherein said step of impinging said selected at least one region with a plurality of particles for a preselected period of time comprises moving a nozzle over and past said at least one region exposed by said mask, wherein said nozzle is moving at a preselected velocity and a plurality of particles originating from said nozzle impinges said at least one region exposed by said at least one aperture.

12. A method for fabrication of a slider, said slider having a first side and a second side, said method comprising the steps of:
placing a mask over said first side of said slider, said mask having a number of apertures exposing a number of regions of said first side, wherein each of said number of regions has predetermined dimensions and a predetermined location on said mask; and
inducing compressive stress within each of said predetermined number of regions exposed by said number of apertures, wherein a selectable change in curvature of said slider is produced.

13. The method of claim 12, wherein said slider has a crown and wherein said step of placing a mask over said first side of said slider includes placing a mask over said first side having apertures dimensioned and located to change said crown.

14. The method of claim 12, wherein said slider has a camber and wherein said step of placing a mask over said first side of said slider includes placing a mask over said first side having apertures dimensioned and located to change said camber.

15. The method of claim 2, wherein said step of inducing compressive stress within each of said predetermined number of regions exposed by said number of apertures comprises directing a stream of particles onto each of said predetermined number of regions exposed by said number of apertures.

16. The method of claim 15, wherein said step of directing a stream of particles onto each of said predetermined number of regions exposed by said mask includes directing a stream of particles onto each of said predetermined number of regions exposed by said number of apertures for a predetermined period of time.

17. A method for fabrication of a slider, said a slider having first side, a second side, and a first edge, wherein said first side includes a number of rails, wherein said rails are disposed parallel with said first edge on said first side, said method comprising the steps of:
placing a mask having a plurality of apertures on said first side of said slider, wherein a number of regions of said first side are exposed, said plurality of apertures having predetermined dimensions and locations and said plurality of apertures excluding said rails from exposure; and
shot peening each of said exposed number of regions with a stream of particles, wherein a curvature of said slider is selectively altered.

18. The method of claim 17, wherein said slider has a crown and wherein said step of placing a mask having a plurality of apertures on said first side of said slider comprises placing a mask having a plurality of apertures on said first side, wherein said plurality of apertures are dimensioned and arranged to alter said crown of said slider.

19. The method of claim 17, wherein said slider has a camber and wherein said step of placing a mask having a plurality of apertures on said first side of said slider comprises placing a mask having a plurality of apertures on said first side, wherein said plurality of apertures are dimensioned and arranged to alter said camber of said slider.

20. The method of claim 17, wherein said step of shot peening each of said exposed number of regions with a stream of particles comprises:
directing a nozzle over each of said number of exposed regions, said nozzle having an opening; and forcing particles through said opening in said nozzle under a preselected pressure.

21. The method of claim 20, wherein said step of directing a nozzle over each of said number of exposed regions includes positioning said nozzle 2.5 millimeters over said mask and moving said nozzle over and past each of said number of exposed regions at a preselected velocity.

22. The method of claim 20, wherein said step of forcing particles through said opening under a preselected pressure includes forcing particles having jagged surfaces though said opening.

23. The method of claim 20, wherein said step of forcing particles through said opening under a preselected pressure includes forcing aluminum oxide particles through said opening.

24. The method of claim 20, wherein said step of forcing particles through said opening under a preselected pressure includes forcing silicon carbide particles through said opening.

25. The method of claim 23, wherein said step of forcing aluminum oxide particles through said opening includes forcing said aluminum oxide particles through said opening under a pressure of 60 pounds per square inch.

26. The method of claim 21, wherein said step of moving said nozzle over and past each of said number of exposed regions at a preselected velocity includes moving said nozzle over and past each of said number of exposed regions at a velocity in a range of about 0.1 inches per second to about 1.5 inches per second, wherein a said curvature of said slider may be altered from about 50 nanometers to about 9 nanometers.

* * * * *